United States Patent
Shen et al.

(10) Patent No.: US 11,113,028 B2
(45) Date of Patent: Sep. 7, 2021

(54) APPARATUS AND METHOD FOR PERFORMING AN INDEX OPERATION

(71) Applicant: Arm Limited, Cambridge (GB)

(72) Inventors: Xiaoyang Shen, Valbonne (FR); David Raymond Lutz, Austin, TX (US); Cédric Denis Robert Airaud, Saint Laurent du Var (FR)

(73) Assignee: Arm Limited, Cambridge (GB)

( * ) Notice: Subject to any disclaimer, the term of this patent is extended or adjusted under 35 U.S.C. 154(b) by 235 days.

(21) Appl. No.: 16/521,740

(22) Filed: Jul. 25, 2019

(65) Prior Publication Data
US 2021/0026600 A1    Jan. 28, 2021

(51) Int. Cl.
*G06F 7/527*      (2006.01)
*G06F 16/22*     (2019.01)

(52) U.S. Cl.
CPC ........ *G06F 7/5275* (2013.01); *G06F 16/2237* (2019.01)

(58) Field of Classification Search
CPC ... G06F 7/5275; G06F 7/5443; G06F 16/2237
See application file for complete search history.

(56) References Cited

U.S. PATENT DOCUMENTS

| | | | | |
|---|---|---|---|---|
| 4,823,258 A | * | 4/1989 | Yamazaki | G06F 15/8061 708/520 |
| 5,392,443 A | * | 2/1995 | Sakakibara | G06F 12/0607 708/520 |
| 5,606,520 A | * | 2/1997 | Gove | G06F 15/17375 708/491 |
| 5,712,999 A | * | 1/1998 | Guttag | G06F 9/355 345/504 |

* cited by examiner

*Primary Examiner* — Chuong D Ngo
(74) *Attorney, Agent, or Firm* — Nixon & Vanderhye P.C.

(57) ABSTRACT

An apparatus and method are provided for performing an index operation. The apparatus has vector processing circuitry to perform an index operation in each of a plurality of lanes of parallel processing. The index operation requires an index value opm to be multiplied by a multiplier value e to produce a multiplication result. The number of lanes of parallel processing is dependent on a specified element size, and the multiplier value is different, but known, for each lane of parallel processing. The vector processing circuitry comprises mapping circuitry to perform, within each lane, mapping operations on the index value opm in order to generate a plurality of intermediate input values. The plurality of intermediate input values are such that the addition of the plurality of intermediate input values produces the multiplication result. Within each lane the mapping operations are determined by the multiplier value used for that lane. The vector processing circuitry also has vector adder circuitry to perform, within each lane, an addition of at least the plurality of intermediate input values, in order to produce a result vector providing a result value for the index operation performed in each lane. This provides a high performance, low latency, technique for vectorising index operations.

19 Claims, 5 Drawing Sheets

ASSUMING VL = 256 BITS

CREATION OF VECTOR OPM [255:0]

1) IF opm INPUT IS 8 BITS

2) IF opm INPUT IS 16 BITS

3) IF opm INPUT IS 32 BITS

4) IF opm INPUT IS 64 BITS

| e | Op1 | Op2 | Op3 | e | Op1 | Op2 | Op3 |
|---|---|---|---|---|---|---|---|
| 0 | 0 | 0 | 0 | 16 | 16 | 0 | 0 |
| 1 | 1 | 0 | 0 | 17 | 16 | 1 | 0 |
| 2 | 2 | 0 | 0 | 18 | 16 | 2 | 1 |
| 3 | 2 | 1 | 0 | 19 | 16 | 2 | 1 |
| 4 | 4 | 0 | 0 | 20 | 16 | 4 | 0 |
| 5 | 4 | 1 | 0 | 21 | 16 | 4 | 1 |
| 6 | 4 | 2 | 0 | 22 | 16 | 4 | 2 |
| 7 | 8 | -1 | 0 | 23 | 16 | 8 | -1 |
| 8 | 8 | 0 | 0 | 24 | 16 | 8 | 0 |
| 9 | 8 | 1 | 0 | 25 | 16 | 8 | 1 |
| 10 | 8 | 2 | 0 | 26 | 16 | 8 | 2 |
| 11 | 8 | 2 | 1 | 27 | 32 | -4 | -1 |
| 12 | 8 | 4 | 0 | 28 | 32 | -4 | 0 |
| 13 | 8 | 4 | 1 | 29 | 32 | -2 | -1 |
| 14 | 8 | 4 | 2 | 30 | 32 | -2 | 0 |
| 15 | 16 | -1 | 0 | 31 | 32 | -1 | 0 |

FIG. 3 e x opm [a:b], WHERE opm[a:b] REPRESENTS ELEMENT SIZED PORTION OF VECTOR OPM

If e = 11 e x opm [a:b] = {opm[a-3:b], 3'b0} + {opm [a-1:b], 1'b0} + {opm [a:b]}
                            op1                    op2           op3

(ADJUSTED FOR +1's FROM 2's COMPLEMENT FORM OF OP2 & OP3)

If e = 27 e x opm [a:b] = {opm[a-5:b], 5'b00010} + {~opm [a-2:b], 2'b11} + {~opm [a:b]}

(due to 2 "+1s")

FIG. 4

APPARATUS AND METHOD FOR PERFORMING AN INDEX OPERATION

BACKGROUND

The present technique relates to an apparatus and method for performing an index operation.

An index operation requires an index value opm to be multiplied by a multiplier value e in order to produce a multiplication result, and may require that multiplication result to be added to a base value opa to produce a result value for the index operation. Accordingly, the index operation can be expressed as opa+exopm, and hence can be viewed as a form of multiply-accumulate operation.

In a vector processing apparatus, it can be desirable to seek to vectorise certain operations, and for the above mentioned index operation it may be appropriate to seek to perform multiple instances of that index operation in parallel in a plurality of lanes of parallel processing provided by the vector processing apparatus. In such a scenario, vector multiply-accumulate circuitry may be used to perform the index operations within the multiple lanes of parallel processing. However, it has been found that there can be a significant latency associated with performing the index operations within the vector multiply-accumulate circuitry, and indeed this latency can increase as the element size (i.e. the size of the index value and the base value) increase. Accordingly, it would be desirable to provide a higher performance mechanism for performing index operations in a vector processing apparatus.

SUMMARY

In one example arrangement there is provided an apparatus comprising: vector processing circuitry to perform an index operation in each of a plurality of lanes of parallel processing, the index operation requiring an index value opm to be multiplied by a multiplier value e to produce a multiplication result, where the number of lanes of parallel processing is dependent on a specified element size, and the multiplier value is different, but known, for each lane of parallel processing; the vector processing circuitry comprising: mapping circuitry to perform, within each lane, mapping operations on the index value opm in order to generate a plurality of intermediate input values, the plurality of intermediate input values being such that addition of the plurality of intermediate input values produces the multiplication result, within each lane the mapping operations being determined by the multiplier value used for that lane; and vector adder circuitry to perform, within each lane, an addition of at least the plurality of intermediate input values, in order to produce a result vector providing a result value for the index operation performed in each lane.

In another example arrangement, there is provided a method of performing an index operation, comprising: employing vector processing circuitry to perform the index operation in each of a plurality of lanes of parallel processing, the index operation requiring an index value opm to be multiplied by a multiplier value e to produce a multiplication result, where the number of lanes of parallel processing is dependent on a specified element size, and the multiplier value is different, but known, for each lane of parallel processing; providing mapping circuitry within the vector processing circuitry to perform, within each lane, mapping operations on the index value opm in order to generate a plurality of intermediate input values, the plurality of intermediate input values being such that addition of the plurality of intermediate input values produces the multiplication result, within each lane the mapping operations being determined by the multiplier value used for that lane; and performing, within each lane, an addition of at least the plurality of intermediate input values, in order to produce a result vector providing a result value for the index operation performed in each lane.

In a still further example arrangement, there is provided an apparatus comprising: vector processing means for performing an index operation in each of a plurality of lanes of parallel processing, the index operation requiring an index value opm to be multiplied by a multiplier value e to produce a multiplication result, where the number of lanes of parallel processing is dependent on a specified element size, and the multiplier value is different, but known, for each lane of parallel processing; the vector processing means comprising: mapping means for performing, within each lane, mapping operations on the index value opm in order to generate a plurality of intermediate input values, the plurality of intermediate input values being such that addition of the plurality of intermediate input values produces the multiplication result, within each lane the mapping operations being determined by the multiplier value used for that lane; and vector adder means for performing, within each lane, an addition of at least the plurality of intermediate input values, in order to produce a result vector providing a result value for the index operation performed in each lane.

BRIEF DESCRIPTION OF THE DRAWINGS

The present technique will be described further, by way of illustration only, with reference to examples thereof as illustrated in the accompanying drawings, in which:

FIG. 3 is a table specifying suitable mapping values that may be employed to control mapping operations performed on the index value in order to generate a plurality of intermediate input values, dependent on the value of the multiplier value e, in accordance with one example implementation;

FIG. 4 illustrates the mapping operations performed on the index value for two example values of the multiplier value e, when using the mapping values set out in the table of FIG. 3.

DESCRIPTION OF EXAMPLES

Figure 1:
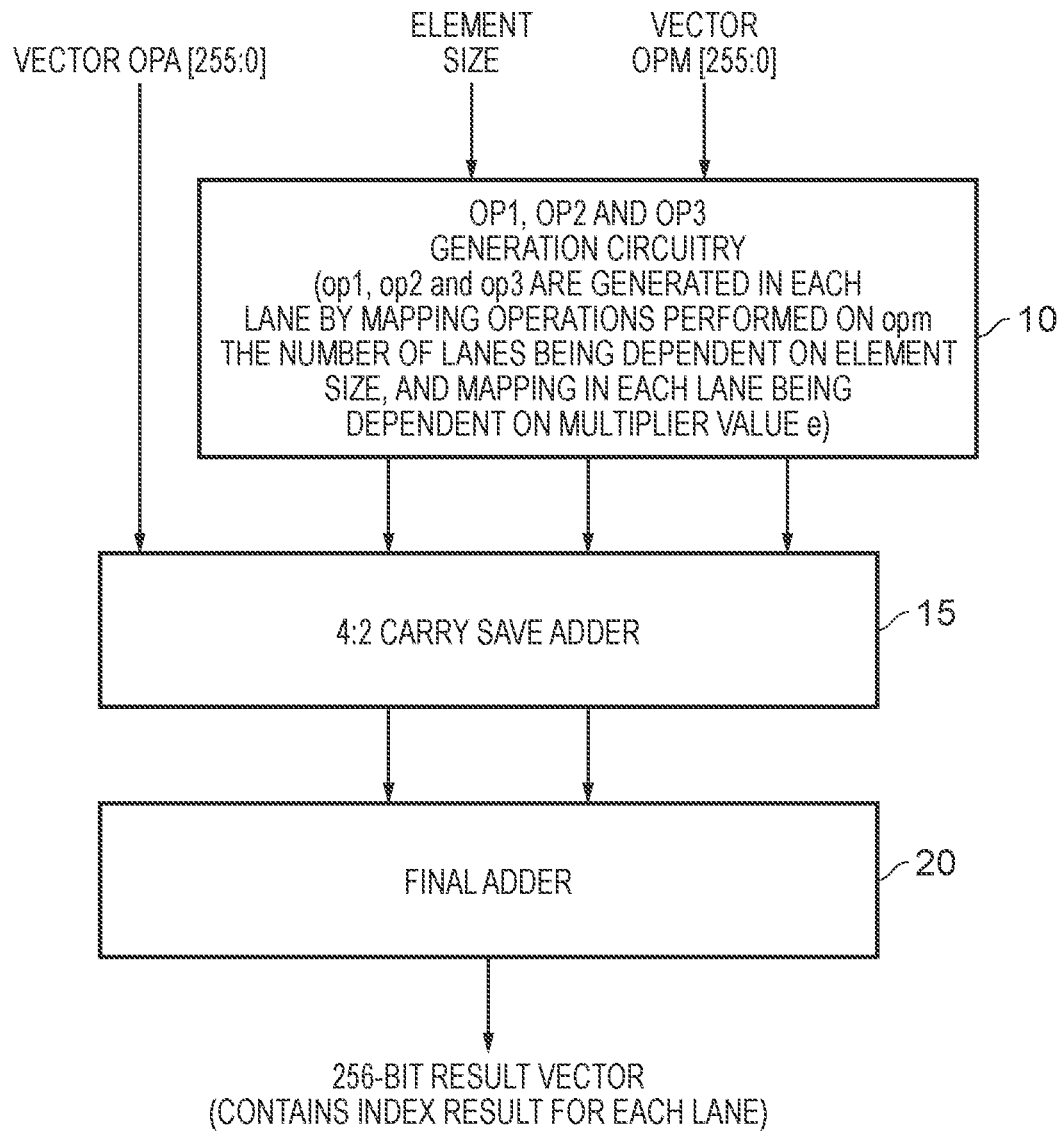
FIG. 1 is a block diagram schematically illustrating a vector arithmetic logic unit (ALU) pipeline that can be used to perform an index operation in each of a plurality of lanes of parallel processing, in accordance with one example implementation.

As discussed above, an index operation can be considered to be a form of multiply-accumulate operation, and hence is typically handled by multiply-accumulate circuitry. However, the inventors realised that, when seeking to vectorise such an index operation, the index value, and the base value where used, can be replicated within each of the lanes of parallel processing, and the multiplier value will vary in a predictable way between each lane. Further, there will be a relatively small number of possible values for the multiplier value, the number of possible values being dependent on the number of lanes of parallel processing. In addition, once the number of lanes of parallel processing is known, the multiplier value required for each lane is effectively fixed, being independent of the source operands (the index value and base value) required to perform the index operation within each of the lanes of parallel processing.

Given these constraints, the inventors realised that it is possible to implement each index operation through a series of addition operations, and hence the use of vector multiply-accumulate circuitry to implement the index operations can be avoided.

Instead, in accordance with the techniques described herein an apparatus is provided that has vector processing circuitry to perform an index operation in each of a plurality of lanes of parallel processing, where the vector processing circuitry includes components to perform addition operations. The index operation requires an index value opm to be multiplied by a multiplier value e to produce a multiplication result, where the number of lanes of parallel processing is dependent on a specified element size, and the multiplier value is different, but known, for each lane of parallel processing. Rather than performing a multiplication, the vector processing circuitry comprises mapping circuitry to perform, within each lane, mapping operations on the index value opm in order to generate a plurality of intermediate input values, the plurality of intermediate input values being such that addition of the plurality of intermediate input values produces the multiplication result. Within each lane the mapping operations required are determined by the multiplier value used for that lane. Vector adder circuitry within the vector processing circuitry is then used to perform, within each lane, an addition of at least the plurality of intermediate input values, in order to produce a result vector providing a result value for the index operation performed in each lane.

By adopting such an approach, it is possible to use vector ALU circuitry to perform the index operations in a plurality of lanes of parallel processing, avoiding the need to use vector multiply-accumulate circuitry for that purpose. It has been found that the latency can be significantly reduced by such an approach, thus providing a higher performance mechanism for vectorising index operations.

The number of intermediate input values that need to be generated by the mapping operations is dependent on the number of possible values of the multiplier value e. Considering by way of example a vector length of 256 bits, and an element size that may be specified to be either 8 bits, 16 bits, 32 bits or 64 bits, it will be seen that the maximum number of lanes of parallel processing will be when the element size is 8 bits. In particular, in that instance the number of lanes will be 32, and hence a different multiplier value will be produced in each of the 32 lanes. However, all integers from 0 to 31 can be represented as an addition or subtraction result of no more than three numbers which are a power of two, and hence the above-mentioned multiplication result can be produced by performing an addition operation on three intermediate input values produced by suitable mapping operations applied to the index value opm.

It should be noted that the techniques described herein are also vector length agnostic, in that they can be readily employed for different vector lengths. Hence they can be used in systems employing the Scalable Vector Extension (SVE) approach developed by Arm Limited, Cambridge, United Kingdom. When using Arm SVE, the instructions can specify the vector length (VL) and the element size (esize). The number of lanes of parallel processing required is then determined by VL/esize, and once the number of lanes is known the techniques described herein can readily be deployed.

In some instances the result value for the index operation may directly be formed by the multiplication result. However, in some instances the index operation may further require the multiplication result to be added to a base value opa in order to produce the result value. In such instances, the vector adder circuitry may be arranged to perform, within each lane, an addition of the plurality of intermediate input values and the base value opa, in order to produce the result vector providing the result value for the index operation performed in each lane. Hence, taking the above example where there may be a maximum of 32 lanes, it can be seen that the vector adder circuitry needs to add no more than four values together in order to produce the result value in each lane.

As mentioned above, due to the nature of the index operation, it is known that the multiplier value will be different, but known, for each lane of parallel processing. In one example implementation the multiplier value may change by a known amount between each adjacent lane of parallel processing. The form that known amount takes may vary dependent on implementation. However, in one example implementation the known amount is the same between each adjacent lane of parallel processing, such that the multiplier value changes by a regular stride amount between each adjacent lane of parallel processing.

The apparatus may support a plurality of different element sizes and hence a plurality of different numbers of lanes of parallel processing. In one example implementation, the mapping circuitry could be made configurable, and adapt how the mapping operations are implemented dependent on the element size. However, in one particular implementation the mapping circuitry is preconfigured to perform the mapping operations to produce the plurality of intermediate input values for each lane for each supported element size. In particular, the mapping operations required may merely involve the manipulation of bits of the index value to implement the equivalent of a shift operation, and in some instances an inversion of the bits of the index value. Further, for a specified element size, the multiplier value e is known, and fixed, for each lane, and hence the mapping required within that lane is also fixed. Accordingly, the mapping operations can be effectively hard wired into the mapping circuitry allowing the mapping operations to be performed quickly for each lane and for each supported element size.

In such an implementation, the mapping circuitry may then further comprise selection circuitry to select, for each lane, the required plurality of intermediate input values based on the specified element size. Such an approach provides a quick and efficient mechanism for computing the required intermediate input values without the need to perform any reconfiguration of the mapping circuitry when changing from performing index operations in respect of one element size to performing index operations in respect of another element size. All that needs to change is the control signal to the selection circuitry to select which of the generated intermediate input values are used.

In one example implementation the mapping operations map bits of the index value opm to bits of each of the intermediate input values. The exact mapping of bits performed will be dependent on which of the intermediate input values is being generated. Further, as discussed earlier, it will depend on the multiplier value associated with the lane under consideration.

In one example implementation, when the multiplier value is zero, all of the intermediate input values will be zero, since it is known that the multiplication result will be zero. Further, when the multiplier value is one, one intermediate input value can be set equal to the index value and hence no manipulation of the bits is required, and the other intermediate input values can be set to zero. However, when the multiplier value is greater than one, the mapping operations performed when generating at least one of the intermediate input values comprise mapping a sequence of bits of the index value opm to different bit positions in the at least one of the intermediate input values.

More particularly, in one example implementation, for each intermediate input value in the at least one of the intermediate input values, the sequence of bits of the index value opm comprise a sequence extending from a least significant bit position to a position excluding one of more most significant bits, the sequence is mapped to bit positions in that intermediate input value extending from the most significant bit down to a bit position excluding one or more least significant bits, and the one or more least significant bits are set equal to a selected value. Hence, it can be seen that the mapping effectively implements a left shift operation, with one or more most significant bits of the index value being discarded when generating the intermediate input value, and with a corresponding number of least significant bits of the intermediate input value being set to a selected value. In one example implementation, the selected value will be a logic zero value in instances where the index value is not being inverted during the generation of the intermediate input value, but instead may be a logic one value when such an inversion is being performed.

In one example implementation, for a subset of the multiplier values the mapping operations comprise producing at least one, but not all, of the intermediate input values as a negative value. There are a number of ways in which an intermediate input value can be produced as a negative value. However, in accordance with one example implementation the mapping operations in such an instance implement two's complement form by inverting the bit values of the index value opm when producing the at least one of the intermediate input values and manipulating one of the intermediate input values that remains as a positive value to incorporate the +1 addition value required by the two's complement form. In particular, it has been found that for situations where at least one of the intermediate input values needs to be produced as a negative value, at least one of the remaining intermediate input values is a positive value that has been produced by an equivalent left shift of the index value to an extent that the number of least significant bits that would be set to zero by that mapping operation are sufficient to incorporate the required +1 addition value to implement the two's complement form.

There are a number of ways in which the index value (and base value where used) can be provided to each of the plurality of lanes of parallel processing. However, in one example implementation the index value (and base value) is of the specified element size, and is replicated within each of the lanes. Hence a vector source operand can be generated in which the index value is replicated so that the source vector is of the required vector length. An equivalent vector source operand can also be generated for the base value in a similar manner.

The multiplier value will typically have an initial value for a first lane of parallel processing. The actual value that the initial value takes may depend on the form of the index operation being performed. Purely by way of example, if the index operation does not use a base value, then the initial value may be a logic one value. However, if the index operation does include a base value, then it may be the case that the initial value for the first lane of parallel processing is a logic zero value.

In one example implementation, the multiplier value is increased by a regular stride amount s for each adjacent lane of parallel processing, such that for each lane i other than the first lane the multiplier value is $e_{i-1}+s$, where $e_{i-1}$ is the multiplier value used in lane i−1. However, it will be appreciated that there is no requirement to arrange for the multiplier value to be adjusted in this way between each lane, and other adjustments could be applied if desired. In particular, the adjustment made may depend on the particular instance of the index operation that is being performed in any particular lane, and hence the relationship between the multiplier value used in each of the lanes may vary by more complex relationships than a regular stride if desired. However, in any event, the multiplier value will be known for each of the lanes and hence suitable mapping operations to produce the required intermediate input values can be performed in each of those lanes.

In the above described technique where a regular stride amount s is used, then the value of the regular stride amount may vary dependent on implementation. However, in one example implementation the regular stride amount is 1.

The vector adder circuitry can take a variety of forms, but in one embodiment comprises carry-save adder circuitry to reduce at least the plurality of intermediate input values in each lane to two final operand values for each lane, and final adder circuitry to add the two final operand values for each lane to produce the result vector. This provides an efficient mechanism for producing the final result vector from the plurality of intermediate input values, and from the base value in implementations where the base value is used.

Particular examples will now be described with reference to the Figures.

FIG. 1 is a block diagram schematically illustrating a vector arithmetic logic unit (ALU) pipeline that can be used to perform an index operation in each of a plurality of lanes of parallel processing, in accordance with one example implementation. The vector ALU pipeline includes generation circuitry 10 for generating intermediate input values for each of the lanes of parallel processing. In the examples described herein, it is assumed that the vector length is 256 bits, and that the minimum element size is 8 bits, meaning that the maximum number of lanes of parallel processing will be 32. For the purposes of the discussion of the figures, it will be assumed that the index operation is of the form opa+exopm, and hence uses both an index value opm and a base value opa.

As discussed earlier, the multiplier value e will be different in each of the lanes of parallel processing. The value of e associated with each lane can be determined in a variety of ways, and indeed it is a matter of design choice as to which particular instance of the index operation is performed within each lane, and accordingly the appropriate value of the multiplier value to use in each lane. However, for the purposes of the implementation described herein, it will be assumed that the multiplier value e for lane 0 will be zero, and that the multiplier value will then be adjusted by a regular stride amount between each adjacent lane. In the particular implementation described the stride amount will be one. As a result, the multiplier value will be one in lane 1, two in lane 2, etc.

The maximum number of the multiplier value will depend on the number of lanes, which as discussed earlier is dependent on the element size, but for the above example it will be appreciated that the maximum value of e will be 31, when there are 32 lanes of parallel processing.

Within each lane, mapping operations will be performed in order to generate from the index value a plurality of intermediate input values. The actual mapping operations performed will vary dependent on which intermediate input value is being produced, and dependent on the multiplier value e.

Since all integers from 0 to 31 can be presented as an addition or subtraction result of no more than three numbers which are a power of two, then the three intermediate input values op1, op2 and op3 can be generated from the index value by appropriate left shift operations, with in some instances an inversion of the index value, as will be discussed in more detail later for example with reference to FIGS. 3 and 4.

It should be noted that once the number of lanes of parallel processing is known, then the multiplier value required for each lane is effectively fixed, since it is independent of the source operands (the index value and the base value) required to perform the index operation within each lane of parallel processing. Hence, as soon as the vector version of opm (called VECTOR OPM herein) is generated by replicating the index value to produce a vector of 256 bits, the corresponding vectors of intermediate input values (referred to herein as OP1, OP2 and OP3) can be generated without delay, since the mapping operations required will then be predetermined.

In the example shown in FIG. 1, three vectors of intermediate input operands are produced and output to the carry-save adder 15. The carry-save adder circuitry is implemented as a SIMD (Single Instruction, Multiple Data) 4:2 carry-save adder, and in addition to the three vectors produced by the generation circuitry 10, a vector replicating the base value (referred to herein as VECTOR OPA) will also be provided to the carry-save adder. The propagation of the carry depends on the element size.

The SIMD 4:2 carry-save adder can then operate in a standard manner to produce two vectors of final operand values in carry-save form which can then be added together by the final adder circuitry 20 in order to produce a 256-bit result vector. This result vector will then contain the result value for each lane.

Figure 2:
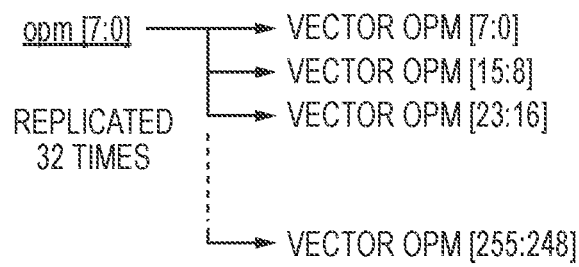
FIG. 2 schematically illustrates how a source vector can be generated from a provided index value, dependent on the element size of the index value, in accordance with one example arrangement.
Figure 2:
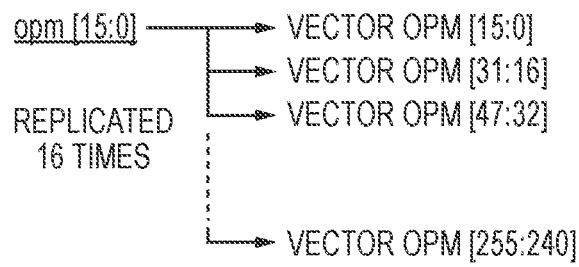
Figure 2:
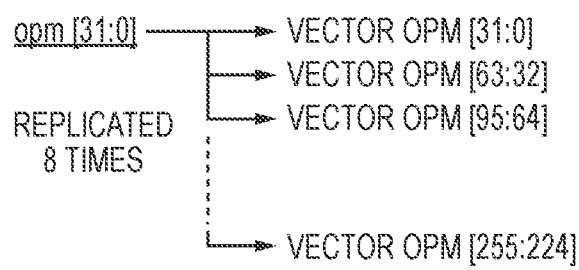
Figure 2:
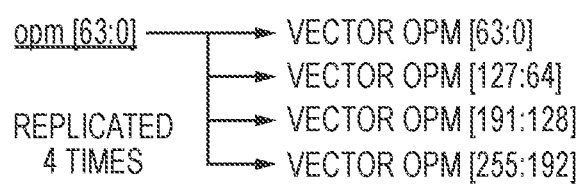

FIG. 2 is a diagram schematically illustrating how VECTOR OPM is created, based on the received index value opm. As is clear from FIG. 2, the provided index value is replicated the required number of times to fill the vector length, in this case 256 bits. Hence, if the index value is 8 bits, it is replicated 32 times, if the index value is 16 bits, it is replicated 16 times, if the index value is 32 bits, it is replicated 8 times, and if the index value is 64 bits, it is replicated 4 times. The same process can also be used to generate the input operand VECTOR OPA, based on the input base value opa.

FIG. 3 is a table showing suitable mapping values that may be employed to control the mapping operations performed on the index value in each lane in order to generate the corresponding intermediate input values op1, op2 and op3. As can be seen, the mapping values change dependent on the multiplier value e, and also vary for the different intermediate input values. A mapping value of 0 means that the corresponding intermediate input value is 0. Hence, when the multiplier value e is 0, it can be seen that the mapping value for all three of the intermediate input values is 0, since it is known that the multiplication result obtained by multiplying the multiplier value of 0 with the index value is 0.

A mapping value of 1 means that the index value is used as is to form the corresponding intermediate input value. Hence, when the multiplier value e is 1, it can be seen that in the example implementation a mapping value of 1 is used for generating the first intermediate input value op1, and mapping values of 0 are used for the other two intermediate input values.

A mapping value of 2 indicates a left shift by 1 bit of the index value in order to generate the corresponding intermediate input value, a mapping value of 4 indicates a shift left by 2 bit positions, an index value of 8 indicates a shift left by 3 bit positions, etc. When performing such shifts, this results in one or more most significant bits of the index value being discarded, and a corresponding one or more least significant bits of the corresponding intermediate input value being formed by logic zero values.

A negative value for the mapping value indicates the requirement to perform a subtraction of the corresponding intermediate input value. In the example implementation, this is achieved by generating the corresponding intermediate index value in two's complement form, so that the two's complement form can then merely be added in the standard manner to the remaining intermediate input values. In accordance with two's complement form, the bits of the input value (in this case the index value) are inverted, and then 1 is added to the result. In the implementation described herein, the addition of the +1 is simplified, since it can be accommodated within one of the intermediate input values that has not been generated by inverting the index value. Hence, when the mapping value is a negative value for a particular intermediate input value, the intermediate input value can be obtained by inverting the bits of the index value, and then performing any required left shift. Where one or more most significant bits of the inverted index value are then discarded, the corresponding least significant bits forming the intermediate input value are set to 1.

As mentioned above, the addition of +1 can be readily accommodated by factoring that into the generation of one of the other intermediate input values that has not been produced by inversion. In particular, it will be seen from FIG. 3 that whenever one or more of the intermediate input values does require to be generated by inverting the provided index value, then the first intermediate input value op1 will have been generated by performing a left shift that is sufficient to ensure that there are a suitable number of logic zero values in the least significant bit positions of the first intermediate input value to accommodate the "+1" required for any other intermediate input value that has been determined via inversion of the index value. If only one of the other intermediate input values has been generated through such an inversion, then a +1 needs to be set in the least significant bit position (bit position 0) of the first intermediate input value op1. If instead both of the other intermediate input values have been generated through inversion, then a +1 needs to be added in bit position 1 of the first intermediate input value op1 to accommodate the two "+1s" associated with the two's complement form used for both the other two intermediate input values.

The generation of the intermediate input values within a particular lane is illustrated by way of example with reference to FIG. 4. In each case, the multiplication exopm[a:b]

is implemented within a corresponding lane by adding together the three intermediate input values op1, op2 and op3. In the first example given, it is assumed that the multiplier value applicable to the lane in question is 11, and hence the mapping values in entry 55 of the table 50 of FIG. 3 are used. For the intermediate input value op1, the mapping value is 8, which as discussed earlier involves a 3 bit left shift of the index value. Hence, as shown in FIG. 4, the first intermediate input value op1 is formed as opm[a−3:b], 3′b0. As a result, it can be seen that the most significant 3 bits of the index value have been discarded, the remaining bits form the most significant bits of the first intermediate input value, and the three least significant bits of the first intermediate input value are set equal to zero.

As shown by the entry 55 in the table 50 of FIG. 3, for the second intermediate input value op2, an equivalent of a 1 bit left shift is required to the index value since the mapping value is 2, and accordingly op2 is formed as shown in FIG. 4. Further, no shift is required when producing the third intermediate input value op3, and hence the third intermediate input value is merely the unaltered index value.

In the second example shown in FIG. 4, it is assumed that the multiplier value e is 27, and hence the mapping values are as shown in the entry 60 of FIG. 3. Hence, the first intermediate input value op1 is produced by performing a 5 bit left shift of the index value. However, as is also apparent from the entry 60 of the table 50 of FIG. 3, a subtraction is associated with the other two intermediate input operands, and this is achieved by using the two's complement form. This means that two "+1s" need to be incorporated in the addition used to produce the multiplication result. This is achieved by adding a logic one value to the bit position 1 of the first intermediate input value op1, as shown in FIG. 4.

Since the requirement to add +1 has been accommodated within the first intermediate input value, when generating the second and third intermediate input values it is merely necessary to invert the bits of the index value and perform the required left shift, with the least significant bits being set equal to 1 as required. Hence, since the mapping value associated with the second intermediate input value op2 is −4, an inversion of the bits followed by a 2 bit left shift is performed, with the two least significant bits being set equal to 1, as shown in FIG. 4. With regard to the third intermediate input value op3, then the mapping value is −1, which merely requires the bits of the index value to be inverted, as shown in FIG. 4.

It will be appreciated from the earlier discussion that the number of lanes of parallel processing is dependent on the element size, and as the element size increases, the number of lanes of parallel processing decreases. As is also apparent from FIG. 3, the manipulations of the index value required to generate the intermediate input values are simpler the lower the multiplier value e. Hence, considering the earlier mentioned example where the supported element sizes are 8, 16, 32 or 64 bits, it will be seen that when the element size is 64 bits, the possible multiplier values are 0, 1, 2 or 3 assuming a vector length of 256 bits, and hence the manipulations required to produce the three intermediate input values are more straightforward than is the case for smaller element sizes. This a very interesting property, since as discussed earlier, when index operations are performed within vector multiply accumulate (MAC) circuitry, the latency increases as the data element size increases. In a particular example implementation, using the vector multiply accumulate circuitry to perform index operations could have a latency of three cycles in most cases, but would have a latency of four cycles when the element size is 64 bits. In addition, the four cycle latency is a result of iteration, which means that the execution needs to occupy the multiply accumulate pipeline for two cycles. This can significantly impact performance. Furthermore, it has been found that in modern data processing systems, the index instructions often use a 64 bit element size, for example when calculating addresses for gather load and scatter store operations. In such scenarios, the performance improvements that can be realised from employing the above described technique, using the vector ALU pipeline instead of the vector MAC pipeline, can be particularly pronounced.

Whilst the generation circuitry 10 of FIG. 1 may be configured based on the element size, so as to perform the required mapping operations within each of the lanes, in one particular example implementation the generation circuitry can be preconfigured so that it generates, from the input VECTOR OPM, vectors of intermediate input values for each possible element size, with the appropriate vector then being selected based on the actual element size. This means that the generation circuitry can effectively be hardwired with regard to the mapping operations performed, thereby simplifying the circuitry used to implement the generation circuitry. Such an approach is illustrating schematically in FIG. 5, which shows the generation circuitry used to generate vectors for one of the intermediate input values. In particular, four separate generation blocks 100, 110, 120, 130 are shown, each being associated with one of the possible element sizes, i.e. 8, 16, 32 or 64 bit. Again it is assumed that the vector length is 256 bits, and accordingly the input VECTOR OPM is 256 bits in size.

It will be understood that if the data element size were 8 bits, this would mean that there are 32 lanes of parallel processing, and within each of those lanes a mapping operation will need to be performed using a different multiplier value (extending between 0 and 31). The circuitry performing these mapping operations is indicated by the mapping blocks 102, 104, 106, each mapping block being associated with one of the lanes. Hence each mapping block 102, 104, 106 will perform a mapping operation on an 8 bit input, determined by the mapping value of FIG. 3 for the multiplier value associated with that lane and the intermediate input value being determined.

The generation block 110 includes 16 mapping blocks 112, 114, 116, since this generation block assumes the data element size is 16, and that accordingly the index value has been replicated 16 times within the VECTOR OPM input. Again, each of the mapping blocks 112, 114, 116 performs a mapping operation as dictated by the mapping value provided in FIG. 3 for the multiplier value associated with that lane and the intermediate input value being determined.

Similarly, the generation block 120 assumes a data element size of 32 bits, and accordingly 8 mapping blocks 122, 124, 126 are provided. Finally, the generation block 130 assumes an element size of 64 bits, and accordingly four mapping blocks 132, 134, 136, 138 are provided.

It will be appreciated that each of the generation blocks 100, 110, 120, 130 produce an intermediate input value vector of 256 bits, and then the multiplexer 140 is used to select the appropriate vector based on the element size. Hence, in any particular instance, the output from one of the generation blocks 100, 110, 120, 130 will be used, and the other three outputs will be discarded.

Figure 5:
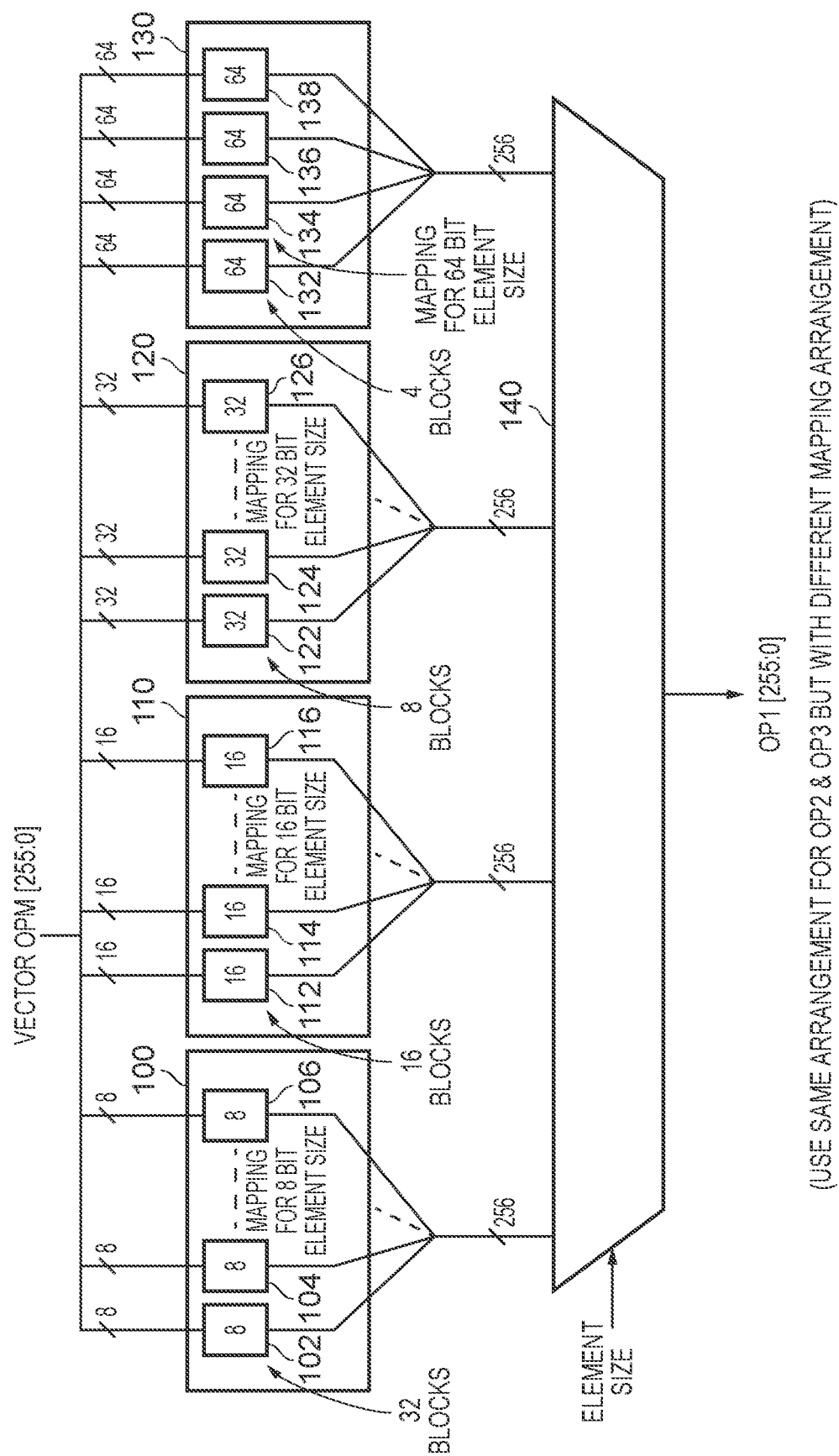
FIG. 5 illustrates the intermediate input value generation circuitry that may be employed in one example arrangement to enable mapping operations to be performed for each supported element size, and then the appropriate intermediate input values to be selected for a specified element size, in accordance with one example arrangement.

The circuitry shown in FIG. 5 is used to generate VECTOR OP1 identifying the intermediate input value op1 for each lane. The circuitry shown in FIG. 5 can be replicated for each of the other intermediate input values, although it will be appreciated that the mapping operation required within each of the mapping blocks will be different for each intermediate input value, given the different mapping values used, as is evident from FIG. 3.

In accordance with the techniques described herein, it will be appreciated that a mechanism is disclosed for allowing vectorisation of index operations in a way that reduces latency, and increases performance, relative to an approach using a vector multiply accumulate circuitry to vectorise the index operations. In particular, the index operations can be converted into a series of additions, through the generation of a series of intermediate input values by performing suitable mapping operations on the index value input to the index operation. Since the multiplier value will change in a predictable way between each lane of parallel processing, once the number of lanes of parallel processing is known, the multiply value required for each lane is effectively fixed, and in particular is independent of the source operands required to perform the index operation within each of the lanes of parallel processing.

Hence, the index instruction used to specify the vector index operation only needs to specify two source operands (opm and opa), and these can be specified either as immediate values, or by identifying registers containing those values. Further, since there will be a relatively small number of possible values for the multiplier value in most practical implementations, the number of intermediate input values that need to be generated is relatively small, and as discussed above in the example implementation only three intermediate input values need to be generated. Those three intermediate input values then merely need to be added together, along with the base value, in order to produce the result of the index operation.

The approach described herein can give rise to significant performance improvements. For instance, in one example implementation the performance of multiple instances of the index operation within the lanes of parallel processing of the vector ALU has a latency of one and a half clock cycles, and hence supports zero cycle forwarding of the result to other modules within the system (within the remaining half cycle). In contrast, performing the same operations in the vector multiply accumulate pipeline will have three to four cycles of latency with no capability of zero cycle forwarding to other modules.

Further, when using the vector ALU circuitry to execute the index operation, the larger the element size is, the simpler execution becomes due to there being less non-zero operands to process. This is in direct contrast to implementations using a vector multiply accumulate unit, where the latency gets larger as the element size increases. This property would allow a trade off to be made in systems that provide both vector ALU and vector MAC circuitry. For example, if desired, it could be decided to use the vector ALU to accelerate vector execution of index operations when the element size is large, but not necessarily for lower element sizes. As discussed earlier, 64 bit element sizes occur frequently in index operations, and accordingly significant performance improvements could be realised even if the vector ALU circuitry is not used for performing all index operations.

As mentioned earlier, when the element size is 64 bits, then in current vector multiply accumulate circuitry implementations, the performance of the index operation may require the execution pipeline to be occupied during two cycles, whereas with the vector ALU pipeline this is not the case. Accordingly, significant improvements in throughput can be achieved when using the vector ALU pipeline in the manner discussed above. Further, it can give the dispatch circuitry more flexibility, as there will be less chance that execution of an index instruction could occupy the pipeline, blocking the execution of other instructions, which could reduce the throughput of other key instructions in a main instruction loop.

Further, it should be noted that the techniques described herein are vector length agnostic. In particular, the technique can be used even when using instruction sets that support variable vector length, such as Arm SVE. In such cases the instruction may specify the vector length and the data element size, and the number of lanes of parallel processing is then determined by dividing the vector length by the element size. Once the number of lanes is known, then the multiplier values will be fixed, and the above described mapping techniques can be used to generate the required intermediate input values for the addition.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
vector processing circuitry to perform an index operation in each of a plurality of lanes of parallel processing, the index operation requiring an index value opm to be multiplied by a multiplier value e to produce a multiplication result, where the number of lanes of parallel processing is dependent on a specified element size, and the multiplier value is different, but known, for each lane of parallel processing;
the vector processing circuitry comprising:
mapping circuitry to perform, within each lane, mapping operations on the index value opm in order to generate a plurality of intermediate input values, the plurality of intermediate input values being such that addition of the plurality of intermediate input values produces the multiplication result, within each lane the mapping operations being determined by the multiplier value used for that lane; and
vector adder circuitry to perform, within each lane, an addition of at least the plurality of intermediate input values, in order to produce a result vector providing a result value for the index operation performed in each lane.

2. An apparatus as claimed in claim 1, wherein the result value is the multiplication result.

3. An apparatus as claimed in claim 1, wherein the index operation further requires the multiplication result to be added to a base value opa to produce the result value, and the vector adder circuitry is arranged to perform, within each lane, an addition of the plurality of intermediate input values and the base value opa, in order to produce the result vector providing the result value for the index operation performed in each lane.

4. An apparatus as claimed in claim 1, wherein:
the multiplier value changes by a known amount between each adjacent lane of parallel processing.

5. An apparatus as claimed in claim 4, wherein the known amount is the same between each adjacent lane of parallel processing, such that the multiplier value changes by a regular stride amount between each adjacent lane of parallel processing.

6. An apparatus as claimed in claim 1, wherein:
the apparatus supports a plurality of different element sizes and hence a plurality of different numbers of lanes of parallel processing;
the mapping circuitry is preconfigured to perform the mapping operations to produce the plurality of intermediate input values for each lane for each supported element size; and
the mapping circuitry further comprises selection circuitry to select, for each lane, the required plurality of intermediate input values based on the specified element size.

7. An apparatus as claimed in claim 1, wherein:
the mapping operations map bits of the index value opm to bits of each of the intermediate input values.

8. An apparatus as claimed in claim 7, wherein when the multiplier value is greater than one, the mapping operations performed when generating at least one of the intermediate input values comprise mapping a sequence of bits of the index value opm to different bit positions in the at least one of the intermediate input values.

9. An apparatus as claimed in claim 8, wherein for each intermediate input value in the at least one of the intermediate input values, the sequence of bits of the index value opm comprise a sequence extending from a least significant bit position to a position excluding one of more most significant bits, the sequence is mapped to bit positions in that intermediate input value extending from the most significant bit down to a bit position excluding one or more least significant bits, and the one or more least significant bits are set equal to a selected value.

10. An apparatus as claimed in claim 7, wherein for a subset of the multiplier values the mapping operations comprise producing at least one, but not all, of the intermediate input values as a negative value.

11. An apparatus as claimed in claim 10, wherein for the subset of the multiplier values the mapping operations implement two's complement form by inverting the bit values of the index value opm when producing the at least one of the intermediate input values and manipulating one of the intermediate input values that remains as a positive value to incorporate the +1 addition value required by the two's complement form.

12. An apparatus as claimed in claim 1, wherein:
the index value is of the specified element size, and the index value is replicated within each of the lanes.

13. An apparatus as claimed in claim 1, wherein the multiplier value has an initial value for a first lane of parallel processing.

14. An apparatus as claimed in claim 13, wherein the multiplier value is increased by a regular stride amount s for each adjacent lane of parallel processing, such that for each lane i other than the first lane the multiplier value is $e_{i-1}+s$, where $e_{i-1}$ is the multiplier value used in lane i−1.

15. An apparatus as claimed in claim 14, wherein the regular stride amount is 1.

16. An apparatus as claimed in claim 13, wherein the initial value of the multiplier value is one of 0 and 1.

17. An apparatus as claimed in claim 1, wherein the vector adder circuitry comprises:
carry-save adder circuitry to reduce at least the plurality of intermediate input values in each lane to two final operand values for each lane; and
final adder circuitry to add the two final operand values for each lane to produce the result vector.

18. A method of performing an index operation, comprising:
employing vector processing circuitry to perform the index operation in each of a plurality of lanes of parallel processing, the index operation requiring an index value opm to be multiplied by a multiplier value e to produce a multiplication result, where the number of lanes of parallel processing is dependent on a specified element size, and the multiplier value is different, but known, for each lane of parallel processing;
providing mapping circuitry within the vector processing circuitry to perform, within each lane, mapping operations on the index value opm in order to generate a plurality of intermediate input values, the plurality of intermediate input values being such that addition of the plurality of intermediate input values produces the multiplication result, within each lane the mapping operations being determined by the multiplier value used for that lane; and
performing, within each lane, an addition of at least the plurality of intermediate input values, in order to produce a result vector providing a result value for the index operation performed in each lane.

19. An apparatus comprising:
vector processing means for performing an index operation in each of a plurality of lanes of parallel processing, the index operation requiring an index value opm to be multiplied by a multiplier value e to produce a multiplication result, where the number of lanes of parallel processing is dependent on a specified element size, and the multiplier value is different, but known, for each lane of parallel processing;
the vector processing means comprising:
mapping means for performing, within each lane, mapping operations on the index value opm in order to generate a plurality of intermediate input values, the plurality of intermediate input values being such that addition of the plurality of intermediate input values produces the multiplication result, within each lane the mapping operations being determined by the multiplier value used for that lane; and
vector adder means for performing, within each lane, an addition of at least the plurality of intermediate input values, in order to produce a result vector providing a result value for the index operation performed in each lane.

* * * * *